Aug. 18, 1936.    W. O. HAMPTON ET AL    2,051,478
ARC EXTINGUISHING APPARATUS
Filed April 25, 1933    6 Sheets-Sheet 4

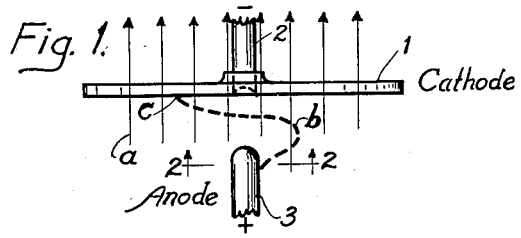
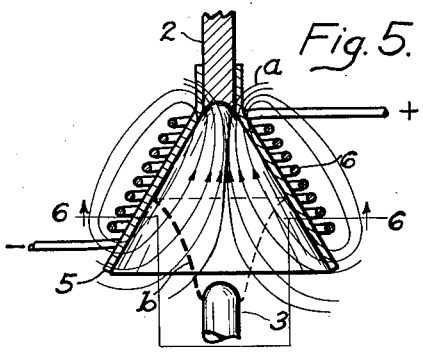
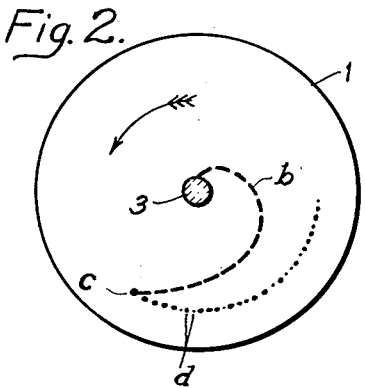
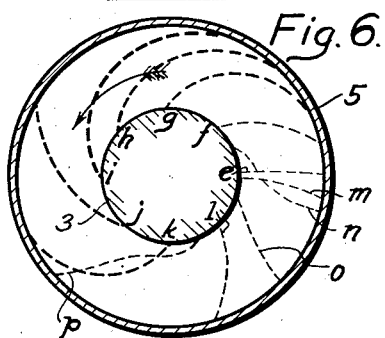
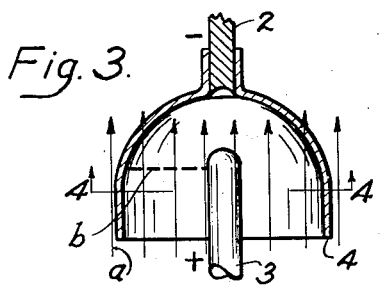
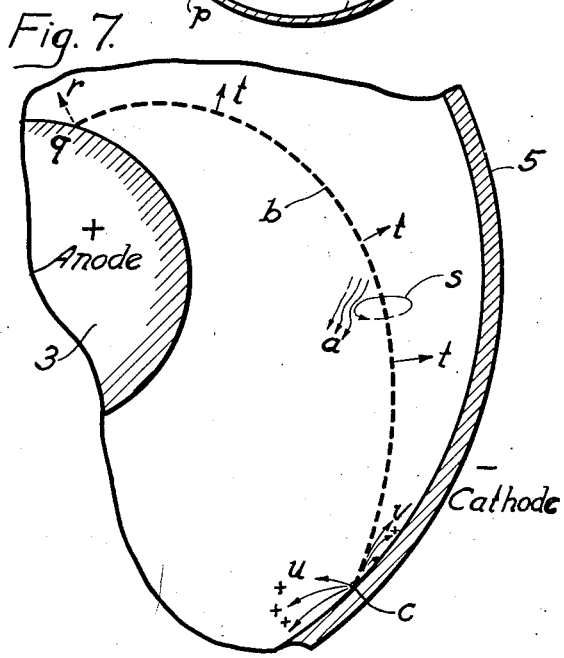
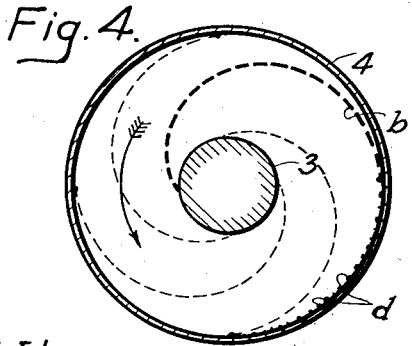

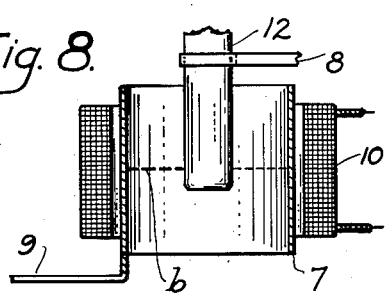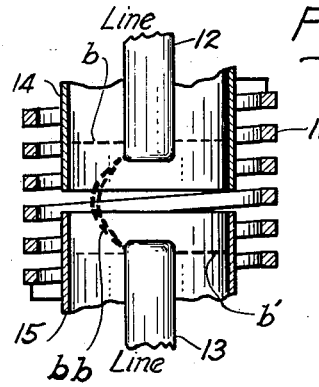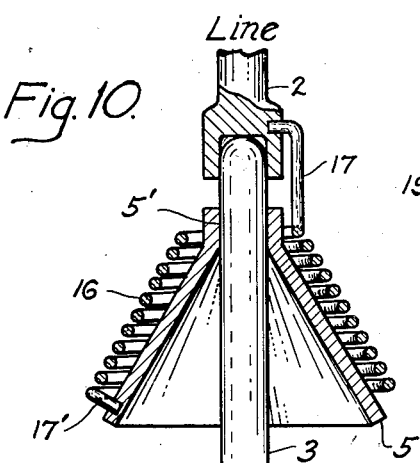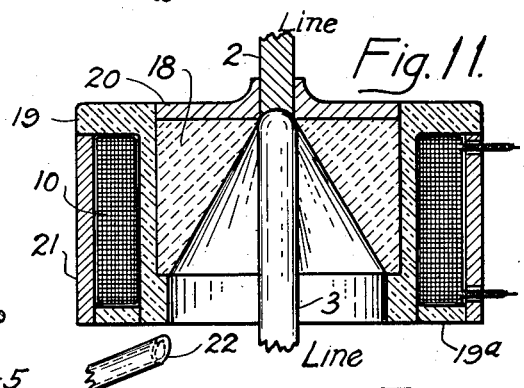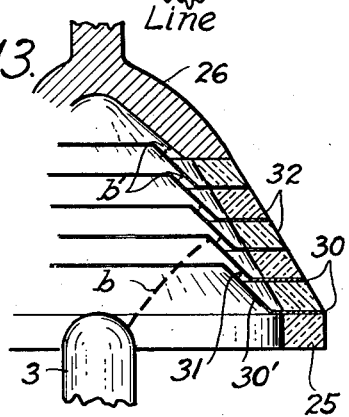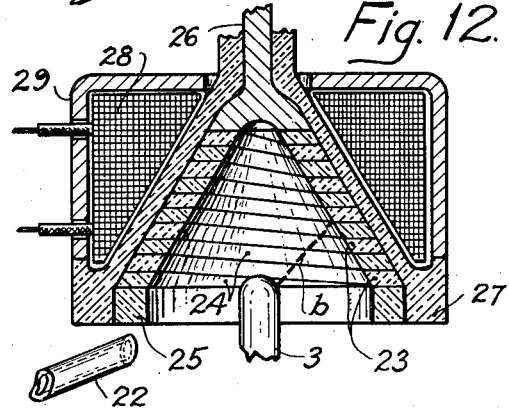

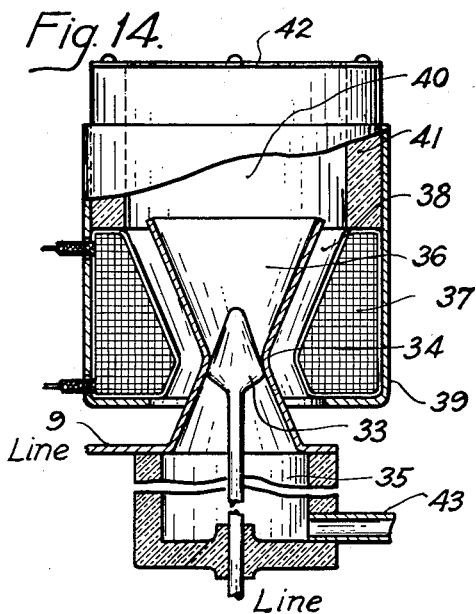
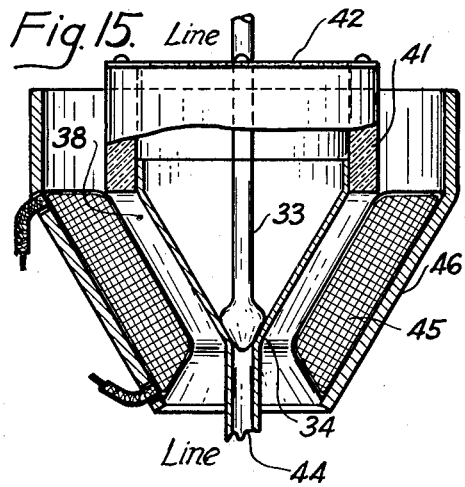
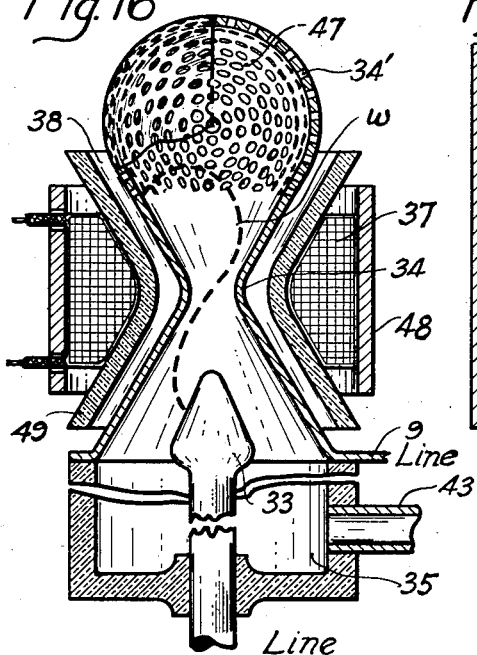
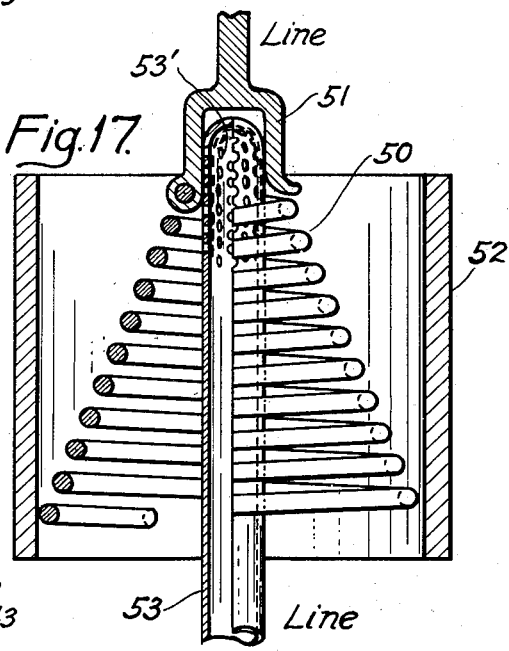

Witnesses
Erie N. Nordheim
Friedrich Daud

Inventors
Nelson O. Hampton
Anthony Van Ryan

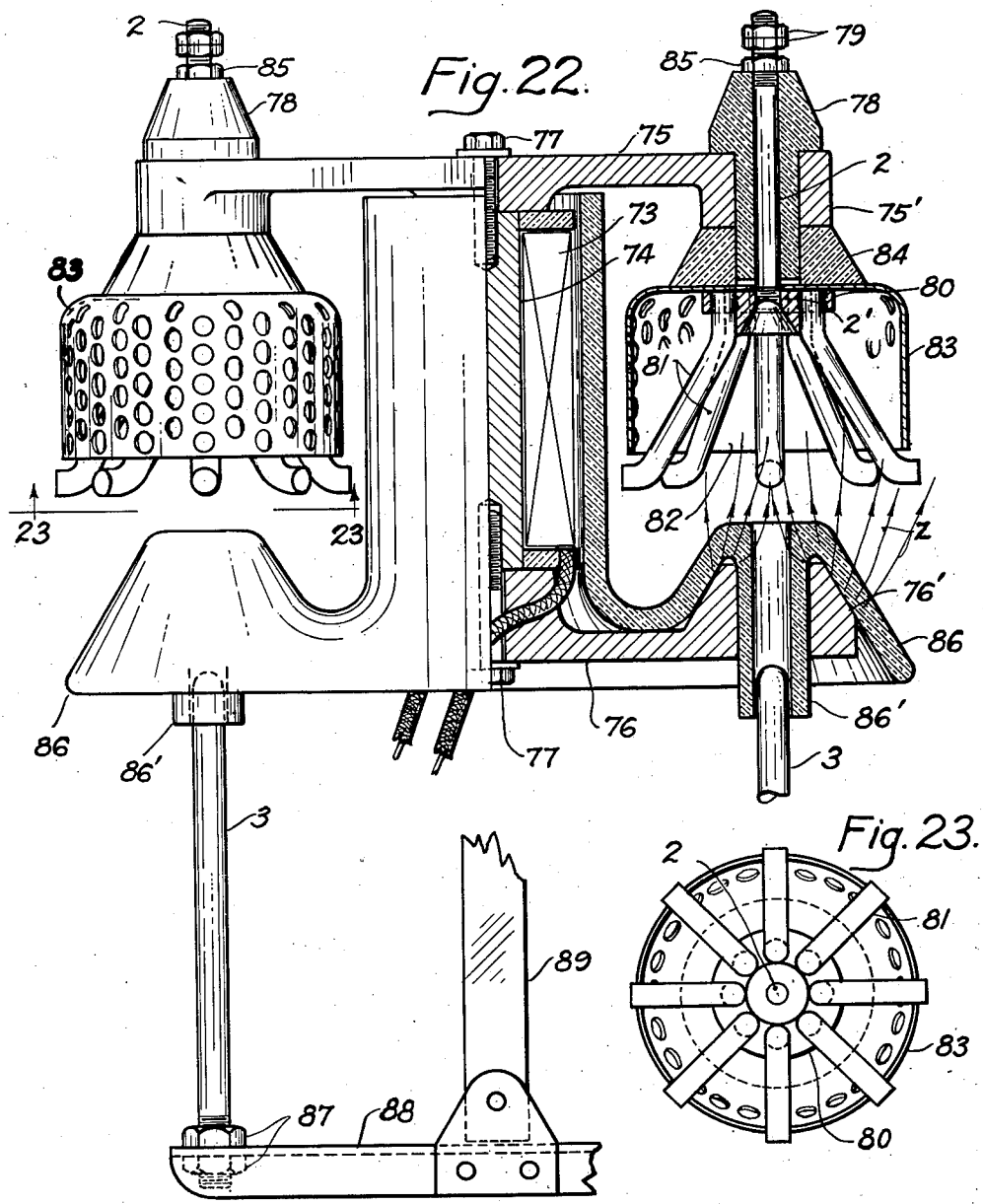

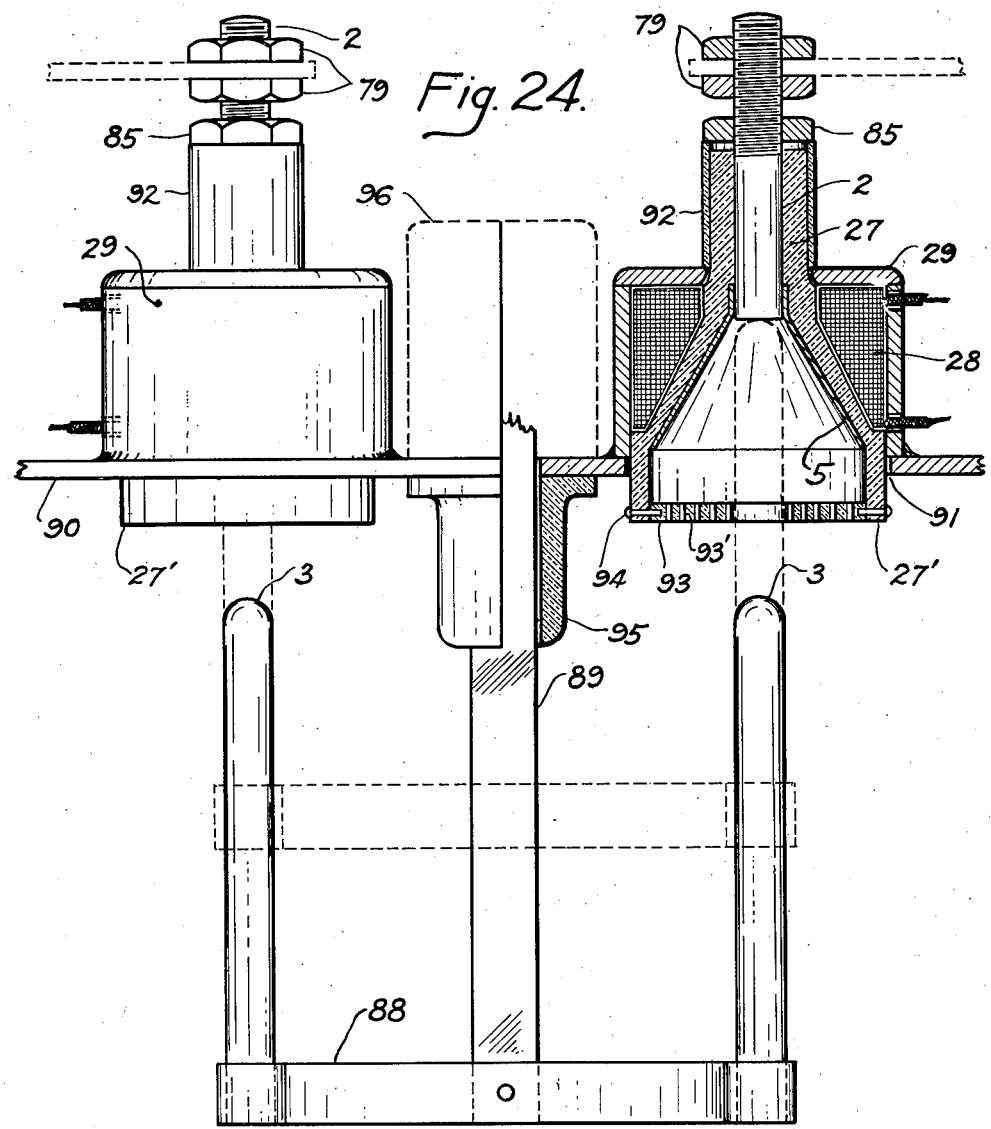

Patented Aug. 18, 1936

2,051,478

UNITED STATES PATENT OFFICE 2,051,478

ARC EXTINGUISHING APPARATUS

Weldon O. Hampton and Anthony Van Ryan, Chicago, Ill.

Application April 25, 1933, Serial No. 667,836

8 Claims. (Cl. 200—144)

Our invention relates to methods and apparatus to be used in conjunction with circuit interrupters, fuses, lightning arresters and other devices, wherein electric power arcs are to be quickly extinguished or their effects brought within control, and more particularly to the interruption of high tension alternating current power arcs.

Although our invention is equally applicable to the interruption or control of direct current arcs, the greatest need of the electrical industry at present is for more efficient, safe and economical high voltage circuit interrupters, especially of high interrupting capacity. We shall accordingly limit the illustration and description of various embodiments of our invention primarily to such uses, relying on the appended claims to particularly define the scope and the features we believe to be new.

The principal purpose of our invention is to provide a simple circuit interrupter structure that will meet the above requirements, embodying a method of maintaining the arc in motion about the main contacts within an arcing chamber, to prevent ionization and increase the voltage drop or impedance of the arc so that it may be easily broken.

In an arc, the positive ions produced by collision with electrons are attracted by and bombard the cathode, thus producing a high temperature. Due to this high temperature at the cathode, most of the ionization accordingly occurs at the cathode root. It is well known, that if the roots of an arc are kept moving over a metallic surface much less ionization results than with a stationary arc. The cathode root may be moved so rapidly that the metallic surface will not be heated sufficiently to produce thermionic emission, or in other words, electrons by volatilization. Such an arc is known as a cold cathode arc. This principle has been successfully applied to air circuit interrupters of the prior art.

It is not so generally known that bending of an arc path or the "stretch effect" may cause considerable increase in the resistance across the arc, or in other words, produce an appreciable voltage drop. Ordinarily this effect is small, but we have discovered that it may be made very large by bending the arc while it is undergoing rapid translation. Clearly, the greatest bending effect can only be obtained with an arc of appreciable length.

The arc extinguisher of our invention is accordingly based on combining the foregoing principles in a novel manner to obtain certain additional effects, and may be classed as of the cold cathode long arc type, wherein an arc is interrupted with a relatively short contact separation, made possible by the high voltage drop so obtained.

Another novel and important feature, which differentiates our structure from the prior art, is the manner in which the main contacts and arcing members are combined into a single unit. It has been necessary heretofore to first establish the arc between arcing contacts and then by separate means, usually cumbersome and slow, transfer it bodily to the extinguishing device a short distance away. With such an arrangement considerable ionization may be introduced into the arc before it reaches the deionizing or extinguishing structure. Therefore the arc will be harder to interrupt, and the arcing interval will be longer as a result.

Briefly stated, in the structure and method of our invention the arc is at all times under the influence of a magnetic field, which causes it to rotate angularly between a central electrode within the confines of an arcing chamber surrounding this electrode. The direction of the magnetic field is such that the arc path assumes the angular rotating form quickly; the arc tending to remain in a plane where the field strength is the greatest. The effects accompanying this action are complex and will be considered in detail after a brief discussion of the present art and other objects of our invention in particular.

Heretofore, it has been the practice with air circuit interrupters to either break the arc up into a series of short arcs between metallic plates and magnetically cause them to traverse the surfaces recurrently at high speeds, or to blow a single arc between widening horns by means of a magnetic blowout device or a gas blast. Such devices while satisfactory when operating under certain voltage and current limitations, are not adaptable to all commercial applications, and for the most part are complicated and expensive to manufacture and maintain. The series short arc type, works on the principle of a cold cathode arc and rapid deionization of the cathode layer on each plate. The total voltage drop across all of the arcs is much higher for a given arc length than with the magnetic blowout type, which depends on mere lengthening and deionization of the arc path. The voltage drop across each arc is about 300 volts, and a great number of plates must accordingly be used in high tension applications.

The present practice in oil circuit breakers tends toward either the use of a magnetic device to blow the arc into an oil trap, or to force a stream of fresh oil into the arc path. Both of these methods depend principally for their effect on improving the dielectric qualities within the gaseous arc path. There is little or no deionizing effect at the electrodes as compared to the cold cathode series arc type air circuit breaker, and consequently the ionization due to evaporation of the electrode material is high and the arc voltage drop therefore low. Aside from this limitation, the oil circuit breaker has well known disadvantages. To insure reliability and safety of operation it must be of a conservative design, which is expensive to manufacture and requires excessive maintenance together with complicated handling equipment to keep the oil in safe condition. Despite all precautions that may be taken, the danger of gas explosions is ever present because of the high oil carbonization.

While we believe, at the present state of the art, that our invention can supplant the oil circuit breaker, we are fully aware from our investigations that the application of our method and apparatus will extend the voltage range of the air circuit breaker. When applied to an oil circuit breaker it will considerably improve the operation, reducing oil carbonization and the hazard of secondary explosions arising as a consequence thereof.

Accordingly it is a principal object of our invention to provide a simple and economical method for increasing the impedance or voltage drop across an arc, so that it may be quickly and easily extinguished without harm to the arcing surfaces and with a minimum ionization or heating of the dielectric media.

Another object of our invention is to provide arc-controlling and extinguishing means that may be readily applied to circuit interrupters, fuses or protective devices, using air, oil, or gas under pressure, as the dielectric medium in which the arc is formed.

It is a further object of our invention to provide an improved high tension air circuit breaker characterized by a compact arcing chamber surrounding the contacts, that shall be effective and safe in operation, and economical to manufacture and maintain.

A further object of our invention is to generally simplify the construction of the cold cathode type of arc extinguisher, by eliminating separate arc starting means and a great number of arcing surfaces in the extinguisher, through the introduction of a high inherent voltage drop within the arc, arising from effects set up by rapid lengthening and angular rotation of the arc path by a strong magnetic field.

A further object of our invention is the provision for the introduction of additional resistance in the form of a high resistance refractory material, as a part of the arc-extinguishing chamber.

A further object of our invention is the provision for the automatic insertion of more impeding effects into the arc circuit in the form of a current limiting reactor, which also generates the electromagnetic field for maintaining the arc in rapid angular rotation within the arcing chamber.

A further object of our invention is the provision for more effective deionization of the arc and electrode surfaces at very high current densities, by the introduction of an air or oil blast into the arcing chamber.

A still further object of our invention is the provision, at high voltage gradients, for the automatic introduction of additional voltage drop effects into the arc circuit, in the form of a series of short cold cathode arcs rotating angularly between spaced rings lining the arcing chamber and in series with the longer angularly rotating arc, under the influence of the same magnetic field.

From the foregoing, it will be understood that our method of dealing with arcs is primarily based on the introduction of considerable voltage drop in the arc path, within a comparatively small space and short time interval. It is a well known fact that if a high voltage drop or impedance, in any form, could be inserted into the arc circuit rapidly enough, the arc energy would be small, and large currents could be greatly reduced and easily interrupted with a relatively short break and without exceeding the thermal limits of the apparatus. Attempts have been made to introduce high values of resistance in this manner, but have been unsuccessful because of potential gradient difficulties, sliding contacts, negative temperature coefficients of the resistors, and high cost generally.

Our invention avoids these difficulties because the voltage drop and impedance is set up by effects, produced within or in the vicinity of the arc itself, arising from arc interaction with a superimposed magnetic field and other factors now to be considered in detail.

For a full understanding of the principles and the preferred modes of applying our invention, reference may be had to the accompanying drawings, in which Fig. 1 is a diagrammatic elevation of the simplest form of an arc extinguishing structure embodying the fundamental elements of our invention.

Fig. 2 is a sectional view on the line 2—2 of Fig. 1, showing diagrammatically the locus of the arc path.

Fig. 3 is a diagrammatic sectional view of a rudimentary structure, to illustrate one of the principles of our invention.

Fig. 4 is an enlarged sectional view taken along the line 4—4 of Fig. 3, showing the locus of a direct current arc.

Fig. 5 is a diagrammatic sectional view of a preferred embodiment of our invention.

Fig. 6 is an enlarged sectional view taken upward from the line 6—6 of Fig. 5, for the purpose of illustrating the mode of operation of this form of our invention when interrupting alternating current arcs.

Fig. 7 is an enlarged portion of Fig. 6, showing diagrammatically what we believe to be the basic principle of our invention.

Figs. 8 and 9 are sectional views of structures for controlling arcs.

Fig. 10 is a sectional view of a structure similar to Fig. 5 except employing a series field coil.

Figs. 11, 12 and 13 are sectional views of arcing chambers illustrating modifications of our invention.

Figs. 14, 15, 16 and 17 are sectional views of further arcing chamber modifications with air, gas or oil blast features.

Fig. 22 is an elevation, partly in section, of a double break circuit breaker employing a single field coil.

Fig. 23 is a view upward from the line 23—23 of Fig. 22, showing the construction of the stationary contact within the arcing chamber.

Fig. 24 is an elevation, partly in section, of another double break structure of preferred form, embodying the principles of our invention.

Figure 18:
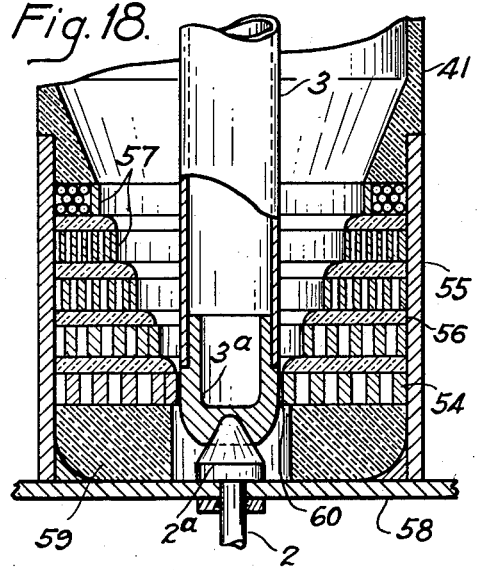
Figs. 18 and 19 are sectional views of additional modifications, using parallel and series reactance coils within the arcing chambers.

In order to simplify the drawings, and the accompanying explanation, most of the various embodiments of our invention illustrated are such as would appear to be more adaptable for use indoors at tensions not exceeding 15,000 volts. However, by a suitable choice of insulation, housings and the grouping of several units in series, the principles involved may be readily extended to the higher voltages, for indoor as well as outdoor service, as will be apparent to those skilled in the art.

In Fig. 1 we have, as a special case of our invention, a simple arcing device suitable for direct current, comprising a metallic arcing plate 1 suitably connected to the negative side of the line by the conductor 2, and a relatively movable metallic rod 3 connected to the positive side of the line. For clearness we have drawn vertical lines "a" to represent a magnetic field which may be applied by suitable means (not shown). When an arc "b" is established it is acted on by the magnetic field and quickly assumes the form shown, rotating rapidly about the central anode 3. The arc root "c" on the cathode is forced far out from the original striking point and compelled to move over the cathode at a very high speed. From Fig. 2 it will be seen that the arc-path is a spiral helix, rotating in the direction of the arrow, and consequently very much longer than the actual separation of the electrodes 1 and 3. Accordingly, it is possible with a sufficiently large cathode plate and powerful magnetic field to extinguish arcs in this novel manner, but it would be economical only for comparatively low voltages and currents.

Our tests prove however that a cold cathode can be obtained with this arrangement and further that the voltage drop across the arc is much higher than for a stationary arc of equal length. Examination by means of high speed photography disclosed that the cathode-spot does not move continuously over the cathode surface but jumps erratically from point to point, as indicated diagrammatically in Fig. 2 by the dots "d". This effect, we believe, is one of the factors that gives rise to the higher voltage drop, as will be explained in detail later with reference to Fig. 7.

In order to confine the apparatus to economical limits for use with higher voltages, the arrangement of Fig. 3 may be used, in which a hemispherical non-ferrous skirt 4 is substituted for the circular plate 1. The arc "b" now seeks to maintain a position at right angles to the lines of force "a", which was only approximately possible before, and therefore rotates at much higher speed. The eye cannot distinguish the individual arc which is extremely thin, although the successive cathode spots are readily seen at low current values. The discharge has the appearance of a spiral nebular glow or a glow resembling that of a pinwheel. Flames, usually associated with stationary arcs, are practically absent; that is to say, there is no volatization of the electrodes or consequent high gas ionization, which is indicative of the importance of maintaining cold electrodes and forcing the arc continuously through the dielectric media. The arc is also quieter and less erratic in this arrangement.

In tests we were able to obtain voltage drops in power arcs equal in amount to 80% of the line voltage, with arc lengths not exceeding twice the normal striking distance obtained between stationary needle gaps. The results vary with the amount of current flowing in the arc, the magnetic field strength and other factors such as the arcing time, composition of the electrode materials and temperature of the electrodes and dielectric. We have found that the voltage drop which develops, limits the current almost immediately, preventing, for a short interval, excessive temperature ionization within the apparatus.

It is of course desirable in all high tension circuit interrupters to reduce the arcing time as much as possible, preferable to one half cycle. This is difficult to attain in existing interrupters, especially of the higher voltages, because of their long stroke and the great speed of break required. In oil circuit interrupters, the problem is further complicated by the retarding action of the oil on the separating contacts.

In apparatus of our invention this problem is simplified by shorter contact separation, which is accomplished in the usual manner by quickly separating the contacts. The arc is extinguished within the arcing chamber and is not drawn out beyond the influence of the magnetic field. We have attained this by constructing the arcing chamber so that the arc will be held within it by magnetic action and extinguished before reaching its mouth. This can be safely assured by properly proportioning the size of the chamber, with respect to the line voltage and interrupting capacity desired, and strength of the magnetic field, or by certain other provisions which will be described later.

In Fig. 5 is shown a preferred mode of attaining this result. The arcing chamber 5 is constructed of thin non-magnetic metal of a funnel shape and has a coil 6 wound about its outer surface insulated therefrom. The magnetic field lines "a" have been drawn in to show the crowding of the lines at the closed end of the chamber 5. This is desired in order to have the greatest flux density where the arc is first formed, so that the arc will be quickly deflected away from the contact surfaces. Without this provision the contacts would attain a temperature high enough for thermionic emission due to the high current that may be carried by a short arc. As the contact and arcing electrode 3 moves downward, the arc "b" tends to maintain a position at right angles to the field, in a locus of maximum flux density consistent therewith, until the position shown is reached, where it finally breaks before the contact 3 reaches full open position.

The coil 6 may be energized from either a low or high potential source although for medium tension voltages we prefer to employ a low potential current as being more economical. Either alternating or direct current may be used irrespective of whether direct or alternating current is to be interrupted, however a stronger field is obtained with direct current for a given size of coil. When alternating current is used it should be approximately in phase with the power current to be interrupted or the arc will not be kept moving properly and hot cathode spots will develop; for average requirements therefore, a uni-directional magnetic field is preferable. When an alternating current arc is established in this field, the direction of arc rotation reverses every half cycle; this does not adversely affect the operation but seems to improve it. This may be explained by the fact that the arc may make several revolutions in a half cycle, and having practically no mass, may be accelerated rapidly in either direction. The reverse takes place at current zero so that it is immaterial in which direction the arc rotates. Air currents tend to follow the arc and will sweep on through the arc-path at current zero to accelerate the recombinations of ions and delay the restriking of the arc.

In Fig. 6 is shown diagrammatically the behavior of an alternating current arc in a unidirectional field when it is arbitrarily assumed that one complete rotation of the arc is made in one-half cycle. After current zero, if the arc restrikes at position "e", it will be deflected to position "f"; the rate of the deflection is proportional to the current flowing, and the arc is increasing in length at "g" and "h", reaching a maximum at "i", after which it begins to shorten at "j" until position "m" is reached, just before current zero. At current zero the air currents set up by the arc sweep the ionized path on beyond "e" and if strong enough may break it up sufficiently to prevent the arc from restriking there; since the remainder of the arcing space has had time to deionize, the dielectric strength of the air has consequently been increased. In general this can only occur after the arc has been lengthened sufficiently by the contact movement to a point where the rate of the voltage recovery across the gap is less than the rate of recovery, or deionization, of the dielectric. If the arc does restrike, it will be deflected in the opposite direction through the positions "n", "o", "p" and so on.

It will be noted that the cathode roots for the successive positions "g", "h" and "i" are close together, indicating that the cathode root is not as easily deflected as the anode root when the current is increasing, although the opposite apparently occurs when the current is decreasing. When the central electrode 3 becomes the cathode, the shape of the arc is somewhat altered because of the now smaller radius; however, when it has sufficient area or cooling means to assure a cold cathode arc for a short period of time, the effect is about the same.

The phenomenon becomes more complex when low power factor circuits carrying large currents are interrupted, and we cannot state with certainty the maximum extent to which the arc may be lengthened and rotated between the electrodes. We have found that the angular force or torque acting on the arc is approximately equal to the product of the arc current, the field flux density and the sine of the angle between the direction of the field and the arc-path, while the resulting angular speed is limited by the inertia of the arc, density and viscosity of the dielectric media and the intensity of ionization at the cathode. Accordingly the arc is blown continuously through a resisting media which tends to reduce the cross sectional area of the arc core and to sweep ions out of the arc-path, thereby greatly accelerating recombination of the ions into neutral atoms.

We have reason to believe that there are other factors contributing to the results obtained, but as the nature of the cold cathode arc is still not clearly understood and subject to much controversy by physicists, our explanation will be based on the generally accepted theory. Regardless of whether our suppositions are correct, we provide a method and means whereby high power circuits may be successfully interrupted by drawing an arc, or relatively few arcs in series, within a confined magnetized space wherein effects are produced which greatly limit the power flowing in the arc. In other words, a method and means is provided whereby the voltage drop across the arc is increased to a value comparable to the line voltage, when lengthened a small amount over its normal striking distance in the medium.

Our theory of the phenomenon may be made clear by reference to Fig. 7, showing an enlarged view of an arc-path at position "i" of Fig. 6. The electrode 3 is the anode at this instant, and by convention the positive terminal where the negative electron current enters the metallic circuit. The electric, or positive ion current, flows in the opposite direction and enters the metallic circuit at the cathode 5. It is assumed that the electrons carry most of the current in an arc where there is appreciable ionization at the cathode. When the cathode temperature is kept low few electrons are emitted from it thermionically, but some are drawn from the cathode due to the potential difference between the electrodes. These electrons on their way to the anode collide with atoms of the dielectric media and free additional electrons which in turn are attracted by the anode and repeat the process progressively. When an atom loses one or more electrons by collision it becomes a positive ion which is attracted by the cathode. A few of the free electrons on their way to the anode recombine with positive ions and form atoms, but the majority reach the anode. Some of the ions eventually collide with the cathode, give up their charge, and become metastable atoms and eventually neutral atoms when removed from the arc-path. Others merely accumulate in the vicinity of the cathode and set up a space charge, which limits the positive conduction and in a measure also the electron current, due to recombination of electrons with ions. The positive ion bombardment of the cathode liberates considerable energy in the form of heat, and as mentioned before, unless the arc root is kept moving, the metal surface beneath the so-called "cathode-spot" quickly volatizes and allows a heavy current to flow.

In our method, the arc is simultaneously moved and lengthened by interaction of the circular magnetic field "s" of the arc and the substantially uniform field "a" which in this instance is directed downward into the paper. The lengthening forces are in the directions "t", and are partly resisted by inertia of the arc and viscosity of the dielectric media, but considerable lengthening and a high speed angular movement of the path "b" is nevertheless obtained. When an appreciable current is flowing, the arc path therefore approaches the anode and cathode surfaces at an acute angle. Positive ions striking the cathode at "c" are partially deflected in the direction of the arrows "u" away from the cathode spot and out of the arc path. On the other hand slow speed secondary electrons, liberated by the bombardment of neutral or metastable atoms on the advancing edge of the arc near the cathode-spot, tend to be deflected in the direction "v" in advance of the arc-path. These deionize some positive ions along the advancing edge of the arc-path and cause a high space charge to be set up ahead of the cathode-spot which must be broken through by electrons as the arc advances. Apparently this effect is responsible for the intermittent movement of the cathode-spots previously referred to. Further, the neutralization of a large percentage of the positive ions takes place gradually from the positive space charge at "u" over a large cathode area, the action being accelerated by the high voltage gradient that is possible with this arrangement. Ionization therefore, especially at the cathode, is largely prevented.

The ionization is less than heretofore obtained with a great number of short arcs, traversing the space between flat parallel plates, under the influence of a magnetic field. Such arcs are not bent appreciably because of their short length and consequently the positive ion current has practically a straight path through them; likewise, the secondary electrons arising from bombarment at the cathode are ejected directly into the arc-path. For this reason the maximum voltage drop that can be obtained with such an arrangement is only about 300 volts per arc, which is entirely due to the rapid deionization at the cathode surface. Usually in these devices the arc movement is accomplished by a radial magnetic field, whereas we employ a substantially uniform longitudinal field within the arcing chamber, compelling the arc-path to rotate angularly between curved surfaces. Our methods and structures are therefore unique and the results obtained depend upon factors not previously applied in arc-extinguishing devices. Another result of our novel arc moving method is the production of a counter-voltage within the arc, due to the arc-path cutting through the stationary field flux. While not appreciable, it assists in reducing the ionization within the arc, and if desired can be increased by arranging the field to also rotate. Still another feature is the possible extraction of considerable energy from the arc by means of induced circulating currents, produced by the alternating magnetic field surrounding the arc. This feature may not always be desirable since circulating currents cause heating of the electrodes. In certain structures of our invention it is possible to utilize this feature by providing suitable means for cooling the electrodes. When this feature is not desired, multiple electrodes can be used or materials of lower conductivity can be employed to minimize circulating currents and consequent heating of electrodes.

In Fig. 8 we have shown a structure, embodying principles of our invention, for extinguishing or controlling an arc by varying the magnetic field intensity only. The central electrode 12 may be stationary and is connected to the line by a conductor 8. The outer electrode 7 is stationary and connected to the other side of the line by conductor 9. The coil 10 is energized from a separate power source in series with a suitable voltage controlling means (not shown), for example a rheostat. When an arc "b" is established it will maintain a symmetrical position in the center of the magnetic field while rotating about the electrode 12. Among other applications, this structure may be applied for improving the performance of the Poulsen arc, used in long wave transoceanic radio transmitters. If the arc is to be maintained continuously, the electrodes 7 and 12, which may be of carbon composition, can be suitably water cooled.

An arrangement as shown in Fig. 9 may be used when it is not feasible or desirable to use a separate source of power for producing the magnetic field through which the arc is moved. In this case the field flux is established by the coil 11, which surrounds and is connected in series with the arcing members 14 and 15; the relatively movable electrodes 12 and 13 are suitably connected to the line. When the electrodes 12 and 13 are separated an arc "bb" is formed, which is deflected by its own magnetic field and finally makes contact with the members 14 and 15. Thus two arcs "b" and "b'" are now formed, which places the coil 11 in series with the arcs and the magnetic field so established causes both arcs to rotate about the electrodes 12 and 13 within their respective arcing chambers 14 and 15. Because the arc is not acted upon immediately by a magnetic field, this arrangement is satisfactory only for striking the arc and limiting the current in a relatively low current circuit.

For high tension circuit interrupters of moderate interrupting capacities, we prefer to use the series coil arrangement as shown in Fig. 10. This structure is similar to that of Fig. 5, except that the stationary contact member 2 is located above and connected to the arcing chamber 5 through the series coil 16 by means of connections 17 and 17'. The movable contact 3 cooperates with an auxiliary contact 5' of the arcing chamber, to shunt the coil 16 out of the circuit when the device is in closed position. When the movable contact 3 separates from the stationary contact 2 the coil 16 is placed in series with the circuit, and after the movable contact 3 breaks connection with the auxiliary contact 5' the arc is drawn. Accordingly the arc is not formed until after the magnetic field is established. A series field arrangement of this kind has the advantage that the flux density of the field is directly proportional to the current to be interrupted.

In order to obtain a maximum field strength it is desirable to reduce the reluctance of the magnetic circuit as much as possible with iron. Fig. 11 shows a modification using such a structure, together with novel means of introducing resistance in series with the arc. The stationary contact 2 is electrically connected to resistor element 18 by means of the circular iron plate 20. The field coil 10 is supported by the insulating members 19 and 19a. A cylindrical iron member 21 surrounds the coil 10 which, together with plate 20, serves as a return circuit for the magnetic flux. When an arc is drawn by the movable contact 3 it will be acted upon in a manner similar to that described with reference to Fig. 5. In addition to the impeding effects due to the rotating arc, as heretofore described, resistor element 18 introduces resistance in series with the arc. To cool the arcing surface of resistor element 18 a blast of air or gas may be introduced into the arcing chamber through the pipe 22, by suitable means (not shown), responsive to opening and closing movements of the contact member 3. The resistor element 18 must be made of comparatively low resistance material, otherwise hot cathode spots are likely to form on the arcing surface. It will be evident that in this arrangement only a small part of the total resistance element will be effective due to so-called "skin effect", while only a short length of resistance is in series with the arc.

While a structure as described above economically provides resistance in series with the arc, its applications can be greatly extended by increasing the total resistance without objectionable surface resistance; in other words, by increasing the length of the resistance path.

In Fig. 12 means are shown wherein such results are obtained. In this construction resistance material 23 is spiraled about the inner walls of insulating chamber 27 which is of conical shape. Insulating material 24 spaces and insulates the turns of the resistance material 23, the whole being supported between an insulating ring 25, the stationary contact member 26, and the one piece insulating chamber 27. A coil 28 encircles the insulating chamber 27, while the coil itself is partially surrounded by the iron member 29 which serves as a return circuit for the magnetic flux. When an arc is drawn between the contacts 3 and 26, resistance is continually introduced into the circuit until the arc is broken. During the arcing period a blast of air or gas may be introduced into the arcing chamber, through the pipe 22, to assist in deionizing the space and cooling the resistance material.

In Fig. 13 an arcing chamber structure is shown whereby an additional voltage drop to that of the angular rotating arc is obtained by means of a number of short arcs in series with the angular rotating arc. In this instance the walls of an insulating chamber such as shown in Fig. 12 are lined with a group of superimposed washers 30, each having an internal edge 30'. Each washer has a smaller internal and external diameter towards the stationary contact member 26 and being separated by the insulating washers 32 small gaps 31 are formed between them. The washers and spacers are clamped into position between the contact 26 and insulating ring 25 within the insulating chamber.

When an arc is drawn by the movable contact 3, the gaps are successively cut into the circuit by the arc as it moves toward the mouth of the chamber. The short arcs which form between the edges of the washers are also rotated by the magnetic field in a manner similar to the longer arc but not necessarily at the same speed.

As it is often necessary to immediately reclose circuit interrupters after a heavy overload or short circuit has been opened, it is desirable to completely remove the gases formed, and to cool the contacts as much as possible, before the circuit is again interrupted, to insure reliable operation. This may easily be done in an air or oil circuit breaker by a blast of air or oil suitably directed against the contacts during and following the arcing period. This feature can readily be applied to structures embodying our invention as shown in Figs. 14, 15, 16 and 17.

Fig. 14 shows a movable contact 33 of conical shape, which co-acts with stationary contact 34 in an expanding nozzle-like aperture, which normally prevents the escape of a compressed gas or air from chamber 35 to arcing chamber 36. The arcing chamber is surrounded by the field coil 37 and insulated therefrom, either by air or other means in the space 38. The field coil is in turn encircled by an iron member 39 which forms the return circuit of low reluctance for the magnetic flux. Chamber 40 with insulated walls 41 and a metal screen 42 is provided to properly confine the arc, within the limits of the apparatus, as it is blown upward by the gas blast when the movable contact 33 breaks connection with the stationary contact 34. During the arcing interval, the arc is rotated angularly between the arcing surfaces of the contacts by the magnetic field established about coil 37. By suitable means the gas or air in chamber 35 may be replenished through the pipe 43 after the contacts are again closed.

A similar modification is illustrated in Fig. 15, except that the moving contact 33 is arranged to open upward instead of downward, and the gas blast introduced directly through the pipe portion 44 of the contact 34. The field coil 45 and pole piece 46 may be of the form shown or like 37 and 39 of Fig. 14.

Still another modification is shown in Fig. 16, wherein the arcing chamber 47 is formed by the stationary element 34 which is of non-magnetic metal construction. A great number of small holes 34' allow the escape of gases to the atmosphere, but effectively confine the arc. It will be noted that the arc can be lengthened considerably in this structure, as diagrammatically shown by dotted line "w", and at the same time greatly agitated, by combined effects of the gas blast, introduced through the pipe 43, and the magnetic field of the coil 37. In this instance a uniform distribution of the field is obtained within the arcing chamber by the cylindrical iron member 48, of low reluctance. An insulating shield 49, in addition to the air space 38, protects and insulates the coil 37.

Fig. 17 illustrates another form of an air or oil blast structure suitable for interrupting high capacity circuits which does not require a separate power source for maintaining the magnetic field. The series coil 50 is wound in the form of a tapered helix, connected to and supported by the stationary contact 51. A cylindrical iron member 52 guides the coil 50 at its unconnected flaring end, and serves as a return circuit for the magnetic flux diverging from the arcing space. The movable contact 53 is a hollow metal tube with numerous small holes 53', drilled through its walls at the contact portion and in the immediate vicinity thereof. By suitable means (not shown), a blast of gas or oil may be introduced at the lower end of movable contact 53 and exhausted through the small openings, in response to contact opening movement. When an arc is drawn between the contact members 51 and 53 it immediately deflects to the turns of the coil 50. Since the flow of current from the arc to the coil undergoes an acute change of direction, a sufficient magnetic reaction is produced to cause the arc to be continuously displaced angularly in a direction along the turns of the coil. As more turns are introduced into the circuit a stronger field is produced which accelerates the deflection. The arc is simultaneously lengthened by the downward movement of the contact 53, the increasing diameter of the coil 50, and the bending or spiraling effect due to the magnetic field. This arc extinguishing arrangement accordingly provides a very efficient cooling and deionizing action within the arcing space. With alternating currents the arc-extinguishing effect is further increased by the self-inductance of the coil 50; also considerable energy may be extracted from the circuit and the arc by eddy currents, set up in the cylindrical iron member 52 by the coil field and dissipated as heat. There will be practically no heating of the arcing electrodes themselves by eddy currents as their surfaces are broken up by air gaps.

Figure 19:
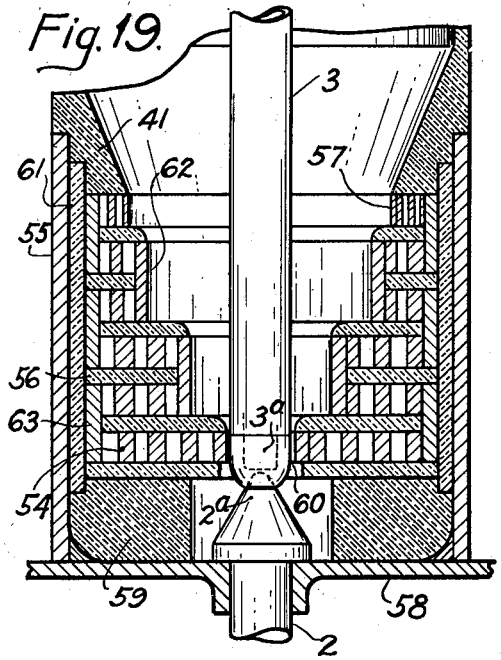

An important feature of the arrangement is the simplicity by which the field coil 50 is automatically cut into the circuit by the play of the arc, thus doing away with auxiliary contacts, which would otherwise be required to shunt the coil out of the circuit when the contacts are in closed position. Other modifications involving this feature are illustrated in Figs. 18 and 19. The only essential difference between Fig. 18 and Fig. 19 is in the arrangement and connections of the field coils. In the former is shown a number of flat coils 54, of progressively greater internal diameter, supported and spaced co-axially in a cylindrical iron housing 55. The coils are insulated from each other by the spacing washers 56, but their outer ends are electrically connected to the housing 55. The lower coils are wound spirally from bar copper, the turns being spaced by suitable insulation. The inner end of each coil is connected to an arcing ring 57 having a similar height and a cross section comparable to the coil conductor. Owing to the smaller space available the upper coil, or coils, may be wound with insulated wire to preferably have a greater number of turns than the lower coils. The housing 55 is welded to an iron plate 58 which supports and is electrically connected to the stationary contact members 2 and 2ª. The coils are rigidly clamped into position between the insulating spacing ring 59 and the insulated arc confining chamber 41 which may be threaded or otherwise affixed to the housing 55. The moving contact member 3 is preferably a copper tube with the outer surface chromium plated. A copper member 3ª is securely affixed to its end, and in closed position engages with the pointed end 2ª of the stationary contact.

In operation, when the contact points 2ª and 3ª separate, the arc is almost instantly transferred to the short space 60 between the moving contact member 3ª and the arcing ring 57 within the first coil. The arc is rotated within the first coil until drawn by the moving contact to the second coil where the action is repeated and so on until the arc is finally broken in the vicinity of the top coil. Thus the arc cuts the coils in and out of the circuit as it moves upward. Only one coil is therefore in the circuit at a time. Accordingly the amount of current that the coils may safely carry with this arrangement is much higher than if part or all the turns of a series coil were in the circuit throughout the arcing period. Another advantage is that the magnetic field density may be maintained at a maximum value for all positions of the arc. In order to compensate for the reduction in magnetic flux as the arc is lengthened and the current decreased, due to effects arising from angular arc rotation, the number of turns in the upper coils may be increased and the size of conductors reduced in proportion to the drop in current.

In Fig. 19, coils 54 are shown connected in series and insulated from housing 55 by a tubular insulating member 61. The arcing rings 62 span two coils and serve as the connections between them, while the arcing ring 57 is connected to the inner end of the upper coil. Similar rings 63 connect the outer ends of alternate pairs of coils together, to effect the series connection. In order that the flux be additive, adjacent coils are wound in opposite directions; therefore, alternate coils are wound in the same direction.

The arrangement is essentially the same as illustrated in Fig. 17, but has greater inductive reactance and is more suitable for use where large currents are to be interrupted. The ability of inductive reactors to limit short circuit currents which may flow in high capacity transmission systems is amply borne out by their widespread use. Owing to the very short time that such reactance is in the circuit of our apparatus, the amount of space and copper necessary for a given percent of reactance, as measured in terms of the total current, is much less than necessary in the usual reactors which are permanently connected into the circuit; that is to say, in this modification of our invention we provide a combined circuit interrupter and reactor which will be economical of manufacture. This result is only made possible by the behavior of the angular rotating arc which forms the basic principle of our invention.

Figure 20:
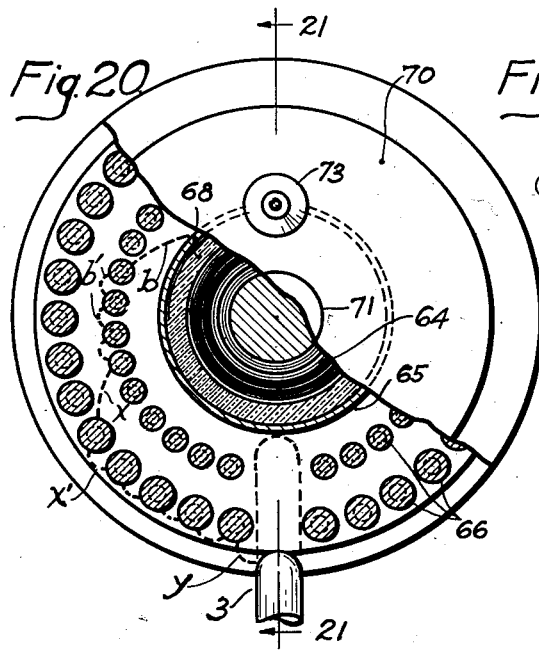
Fig. 20 is an elevation, partly in section, of a circuit interrupter combining the principles of our invention with a system of short arcs in series.
Figure 21:
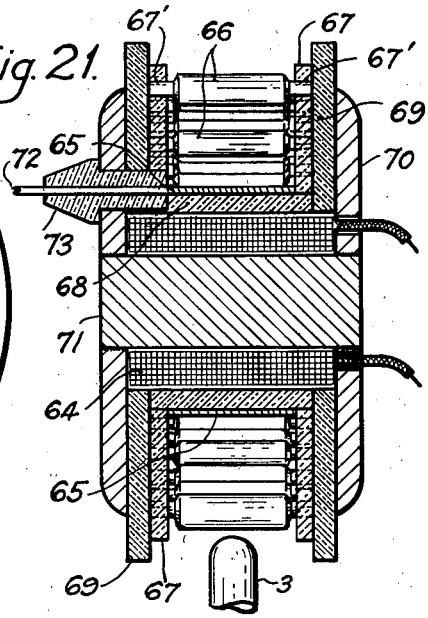
Fig. 21 is a sectional view along the line 21—21 of Fig. 20.

The structures illustrated in Fig. 20 and Fig. 21 are similar in principle to Fig. 13; that is, additional arc voltage drop is provided in the form of a number of short arcs in series with the long arc. Here however the field coil 64 is located within a central contact and arcing member 65. Short gaps are formed by spaced parallel, roller shaped members 66, the ends of which are supported by insulating discs 67 in holes 67'. An insulating spool 68 with removable ends 69 holds the spaced rollers in position between the iron pole pieces 70 and also supports and insulates the stationary contact and arcing member 65, as well as the coil 64. The pole pieces 70, screwed to the iron core 71, hold the complete structure together. The high tension lead 72 is brought through a suitable bushing 73 and secured to the contact and arcing member 65. When in closed position, the movable contact 3 has the position indicated by the dotted lines.

Now assuming that the contact 3 has moved to the position shown, in response to an overload condition, and that the field coil 64 has been suitably energized, the arcs "b", "b'", "x" and "x'" and "y" result. The long arcs "b", and "x" rotate angularly in the same direction, but at different speeds, consequently the number of small arcs "b'" and "x'" depend on the relative positions of the long arcs. While the short arcs are not rotated, they are greatly lengthened by the blowing effect of the magnetic field, which causes them to play rapidly over the length of the rollers and hot cathode-spots are thereby prevented. In practice the contact movement can be made so rapid that the arcs will not have time to establish across all of the short gaps but will be extinguished by the time the contact 3 reaches the position shown. Energy is also extracted from the arc in heating the rollers. Heated air, generated by the arcs, is forced through the gaps between the rollers, and exhausted to the atmosphere. This aids materially in lengthening and blowing out the short arcs. The circuit is effectively interrupted when any of the arcs fail to restrike.

The circuit interrupter structures so far described have shown the application of our invention to single break contacts. However, the invention is not limited to such use but may readily be applied to multi-break interrupters. In practice it is usual to employ double break per phase contacts in order to preserve a general symmetry of arrangement and economy of construction. This avoids the necessity for a sliding or flexible electrical connection to the movable contact. Other advantages of double break interrupters are: complete disconnection of the movable contacts from the power source in open position, and more uniform voltage gradients in the vicinity of the contacts. Typical applications of our invention to such double break arrangements are shown in Fig. 22 and Fig. 24.

As a consequence of the symmetrical structural arrangement shown in Fig. 22, a single electromagnet may be used for producing the magnetic field between both pairs of contacts. The electromagnet 73 is here shown between two stationary contacts of the same phase, although it could serve for any number of contacts desired. The double magnetic circuit is formed by the iron core 74 and the upper and lower iron members 75 and 76 affixed to the core by bolts 77. The direction taken by the field in the air gap is shown by the dotted lines "z" between the pole pieces 75' and 76'. Supported on and fitting within the upper pole pieces are insulating bushings 78 through which the terminal studs 2 extend. Suitable nuts 79 provide a convenient means for connecting the high tension leads. The lower end of the studs 2' thread into copper plates 80 to which are fixed a number of metal rods 81 that flare downward to form conical shaped cages or arcing spaces 82. Cup-shaped perforated baffle screens 83, of non-magnetic metal, partially surround the rods 81. The entire contact and arcing chamber assemblies are rigidly clamped into position between the lower insulating bushings 84 and the pole pieces 75' by means of nuts 85. A moulded insulating member 86 covers the side of the coil and extends completely over the upper surface of member 76. Integral bushing extensions 86' fit into the hollow pole pieces 76'. Guided loosely in these extensions are the movable contacts 3, which are clamped by means of the nuts 87 to the cross connecting copper member 88. An insulating member 89 or "pull rod", usually made of wood, is suitably connected to the middle of cross member 88 and actuated by the usual operating device, (not shown).

The mode of operation is substantially the same as for Fig. 5. As the coil is not wound about the arcing chamber, free circulation of air around the stationary arcing surfaces is readily permitted by the perforated baffle screens 83. Another advantage is that circulating currents cannot be set up in the walls of the arcing chamber proper, so that some heating of the arcing electrodes and arcing space which would otherwise result is avoided.

The form of our invention shown in Fig. 24 illustrates a preferred mode of construction for a double break, high voltage, air circuit interrupter using a separately energized field coil about each contact. All the principles set forth previously, with reference to the diagrammatic Figures 5, 6 and 7, are embraced in this structure. In addition, simple baffles assure the confinement of the arcs within the arcing chambers. The coils 26, the iron housings 29, and the insulations 27, between the coil and high tension conductors, are of the same form as shown in Fig. 12. The housing members 29 are secured to a mounting plate 90 coincident with openings 91, through which the insulating members 27 extend. The conical arcing electrodes 5, which are non-magnetic and have a high melting point, are secured to the copper contact studs 2. Nuts 85 clamp the parts into position within the housings 29 by means of insulating tubes 92 slipped over the bushing portions of the insulations 27.

To effectively confine the arcs within the arcing chambers, against the blast of heated air that may be formed when the contacts first separate, the baffle plates 93, made of refractory material such as Micanite, are fastened by means of pins or screws 94 within the insulating members at 27'. In order not to obstruct the proper venting of gases generated by the arcs, a great number of small holes 93' are drilled in the baffle plates 93.

The contacts 3 are connected to the copper cross bar 88, which is affixed to the insulated pull rod 89. An insulating member 95 guides the upper end of the pull rod 89 into a straight line linkage mechanism, located in a housing described by the dotted lines 96 but not drawn in detail. Dotted lines clearly indicate the closed position of the interrupter.

In operation the interrupter is closed by hand or suitable motor or solenoid mechanism, against the tension of a spring until latched by a trip device. When this trip device is actuated, either manually or in response to an overload condition, a circuit is immediately closed through the field coils 26, before the moving contact system is unlatched. Accordingly, the arcs cannot be drawn until after the magnetic flux is established within the arcing chambers.

Owing to the short stroke that may safely be used in our novel air circuit interrupter, it is possible to open and interrupt circuits in as short a period as one-half cycle of the usual sixty-cycle wave. Thus it will be seen that we have provided means by which an arc of considerable current and voltage value may quickly be extinguished without the use of a liquid medium for quenching the arc, and that the structure effecting this result is relatively small and economical to manufacture.

There has been described in detail some of the various forms that our invention may take, in order to indicate a few of the many ways in which the principles thereof can be put into practice; but it is to be understood that the invention is not limited to the details described.

Many modifications of the precise embodiments of our invention here described will, in fact, be evident to those skilled in the art from the mere attempt to adapt the principles and method here disclosed to circuits of particular voltage or current ratings. These principles are, in fact, of broad applicability to many other purposes than those of circuit interruption, as pointed out previously. That is, we have provided methods and structures, for the control and extinguishment of electric arcs, which are simple, reliable and economical and that may be readily used in any suitable gaseous or liquid dielectric. The novel magnetic arc moving arrangement can be made effective the moment the arc is struck, to cause a high voltage drop and rapid rate of deionization within the arc.

We desire, therefore, that the language of the accompanying claims shall be granted the broadest reasonable construction to cover all modifications and arrangements falling within the spirit of our invention, and that our invention be limited only by what is explicitly stated in the claims and by the prior art.

We claim as our invention:

1. In a circuit interrupter; an arcing chamber forming a stationary electrode and having a perforated dome section above a constricted flaring neck, a movable electrode symmetrically disposed in contact making relation within the neck of said stationary electrode, means for establishing a magnetic field to cause rapid gyration of an arc formed in said arcing chamber in response to circuit opening movement of said movable electrode, and simultaneous means to force a blast of air or gas through the neck of said electrode into said arcing chamber.

2. An electric arc-extinguishing structure comprising an insulated arcing chamber, a tapered helical coil of resistance material, insulating means disposed between the turns of said coil, said tapered helical coil with said insulating means forming a lining for said insulated arcing chamber, a stationary contact located within said arcing chamber and situated above and making electrical connection with said helical coil, a movable contact co-acting with said stationary contact, means for producing a magnetic field within said arcing chamber responsive to the separation of said contacts, and means affording a return circuit of low reluctance for the flux of said magnetic field said magnetic field in interaction with an arc struck between said contacts to cause successive resistance to be automatically inserted in series with said arc.

3. An arc-extinguishing chamber comprising a substantially conical shell of insulating material, a contact situated within the apex of said shell, a plurality of co-axial metallic washers of progressively smaller diameter spaced and insulated within said shell, each of said washers having a flared over internal edge so as to form a series of annular gaps and constituting a protective lining for the walls of said shell.

4. In a high tension circuit interrupter structure a means for adding inductance coils in series with an arc, comprising a pair of contacts for striking an arc to open the circuit, and an arcing chamber surrounding said contacts and affixed at one end to one of said contacts, said arcing chamber consisting of a metallic sleeve, a plurality of spaced flat windings insulated within said sleeve, and a plurality of metallic bands disposed to form a series connection between said windings.

5. In a circuit breaker, a stationary contact and a relatively movable contact, a plurality of conducting rods connected to and diverging from said stationary contact, an electro-magnet, and a pair of pole pieces affixed to said electro-magnet providing a support for said stationary and said movable contact, said conducting rods being centrally located in the gap between said pole pieces.

6. A circuit controlling device comprising a laterally closed arcing chamber of internally conical configuration, a contact connected to the small end of said chamber, a movable contact arranged to cooperate with said first contact, coil means arranged around said chamber for setting up a magnetic field for rotating an arc between said contacts over a non-recurrent path along and within said chamber, a plurality of resistance means disposed along said path, said resistance means being progressively effective in the circuit of said rotating arc.

7. A circuit controlling device of the class described comprising, an arcing member forming an internally conical laterally closed arcing chamber, a plurality of separate interconnected resistance means disposed on said member, and a cooperating arcing member disposed within said chamber and adapted to establish an arc with the wall thereof which passes progressively over said separate interconnected resistance means.

8. In a circuit interrupter, an arcing chamber forming a substantially stationary electrode and having a perforated dome section above a constricted neck, a movable electrode substantially symmetrically disposed in contact making relation within the neck of said stationary electrode, and means for establishing a magnetic field to cause rapid gyration of an arc formed in said arcing chamber in response to circuit opening movement of said movable electrode.

WELDON O. HAMPTON.
ANTHONY VAN RYAN.